UNITED STATES PATENT OFFICE.

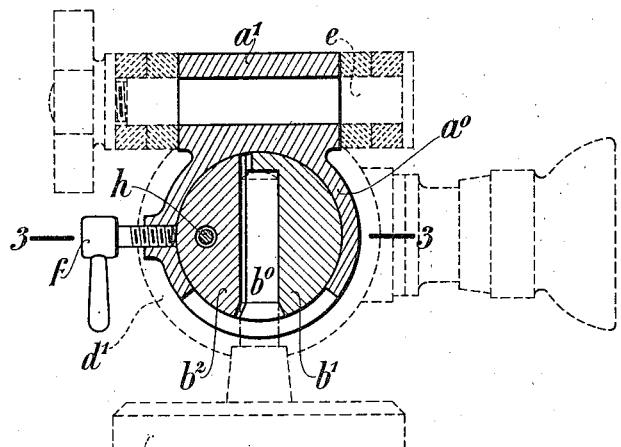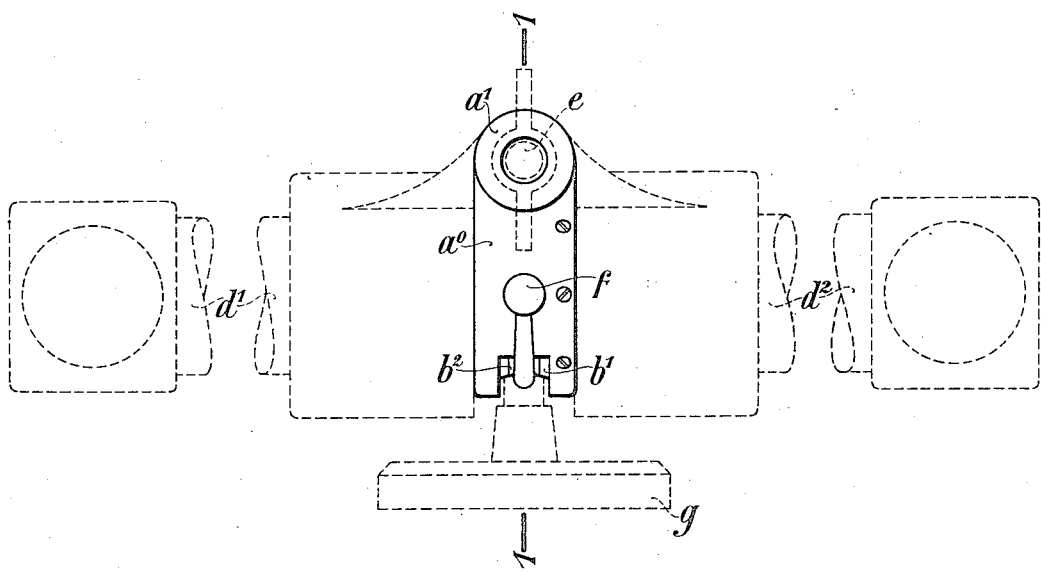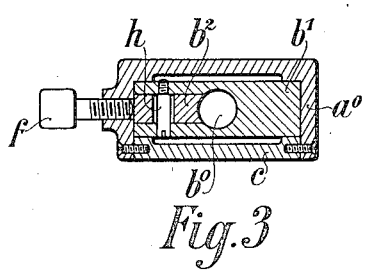

OTTO MACKENSEN, OF JENA, GERMANY, ASSIGNOR TO THE FIRM OF CARL ZEISS, OF JENA, GERMANY.

TELESCOPE-CARRIER.

1,032,011.  Specification of Letters Patent.  Patented July 9, 1912.

Application filed August 24, 1910. Serial No. 578,758.

*To all whom it may concern:*

Be it known that I, OTTO MACKENSEN, a citizen of the German Empire, residing at Carl-Zeiss strasse, Jena, in the Grand Duchy of Saxe-Weimar, Germany, have invented a new and useful Telescope-Carrier, of which the following is a specification.

The invention consists in an improved carrier for hinged stereo-telescopes.

The carrier as hitherto used is composed of an upper part or head, forming the carrier proper, and a base part. The base part is adapted to be mounted on a stand. The top of the carrier head is formed by a two-parted bearing for the hinge bolt of the stereo-telescope. The head and the base part are joined with each other through a hinge, which allows the head to be inclined to some extent in the vertical sighting plane and thus serves for vertically pointing the telescope. This hinge is equipped with an axial clamping screw. The head extends so far upward that even in the stretched (horizontal) position of the hinged stereo-telescope the clamping screw is still accessible, because all parts of the telescope lie above the level of the carrier hinge.

According to the present invention the head of the carrier is transformed to extend so much less upward that the center of gravity of the hinged stereo-telescope, when the latter is supported in its stretched position, lies about in the axis of the carrier hinge, about which the telescope is to be rotated for being pointed vertically. The use of the hinged stereo-telescope is in this way considerably facilitated, because the stretched position is principally employed. The said transformation so much reduces the weight of the head that the carrier can henceforth remain joined with the hinged stereo-telescope. In this case the head can be simplified by shaping the bearing for the telescope hinge bolt as an undivided bearing or sleeve. The clamping screw of the carrier hinge can be radially arranged, for instance in the head, when the latter is provided with the bearing of the carrier hinge. In the latter case the base part of the carrier comprises the journal of the carrier hinge, and when it consists only of this journal and is adapted to be mounted on an upright stand pivot by means of a vertical and radial bore, it may be divided along this bore with the effect that the radial clamping screw, in addition to hindering the rotation of the head about the carrier hinge, suppresses the rotatability of the carrier on the stand pivot.

In the annexed drawing: Figure 1 is a section along the vertical sighting plane through a carrier for hinged stereo-telescopes, constructed according to the invention, the position of the telescope being indicated by dotted lines. Fig. 2 is a back view of this arrangement. Fig. 3 is a horizontal section on line 3—3 of Fig. 1.

The bearing $a^0$ of the carrier hinge appertains to the head. The two-parted journal $b^1\ b^2$ of this hinge, forming the base part of the carrier, is retained in the bearing $a^0$ by a cover $c$. As may be seen from Fig. 2, the journal and the bearing are sufficiently short in the direction of the axis as to accommodate to the narrow space between the limbs $d^1\ d^2$ of the telescope when stretched. The telescope is mounted by means of its hinge bolt $e$ in the undivided sleeve $a^1$ of the head. A clamping screw $f$ is radially arranged in the bearing $a^0$. For the purpose of receiving the upright pivot of the stand head $g$, a bore $b^0$ is provided in the base part $b^1\ b^2$. Along this bore the two parts $b^1$ and $b^2$ of the journal are joined together in such a manner that the part $b^2$, that is immediately subject to the action of the clamping screw $f$, forms an insertion only of the journal proper $b^1$. With this arrangement, in addition to the rotatability of the head $a^0\ a^1$ on the base part $b^1\ b^2$, the rotatability of the carrier on the stand head $g$ is suppressed and restored by tightening and loosening respectively the clamping screw $f$. A bolt $h$ secures the insertion $b^2$ against dropping out.

I claim:

1. A carrier for hinged stereo-telescopes, consisting of a base part adapted for rotation on a stand in the horizontal plane and a head part jointed to the said base part so as to be rotatable to some extent in a vertical plane, a bearing for the hinge bolt of the telescope being rigidly connected with the head part and located closely above the carrier joint with its axis crossing the axis of the joint at right angles.

2. A carrier for hinged stereo-telescopes, consisting of a base part adapted for rotation on a stand in the horizontal plane and a head part jointed to the said base part so as to be rotatable to some extent in a vertical plane, the base part presenting the journal and the head part the bearing of the joint, the head part being further formed closely above the carrier joint as an undivided sleeve for the hinge bolt of the telescope, and the sleeve axis crossing the axis of the joint at right angles.

3. A carrier for hinged stereo-telescopes, consisting of a base part adapted for rotation on a stand in the horizontal plane, a head part jointed to the said base part so as to be rotatable to some extent in a vertical plane, the head part being formed closely above the carrier joint as an undivided sleeve, with its axis crossing that of the joint at right angles, and comprising the bearing, and the base part forming the journal, of this joint, and the base part being fitted with a bore in a radial and vertical direction, for mounting the carrier on the pivot of a stand, and being divided along this bore, and a clamping screw radially fitted in the bearing portion of the head part.

OTTO MACKENSEN.

Witnesses:
PAUL KRÜGER,
ALFRED MACKEDANZ.